A. COLTON & B. W. SCOTT.
MACHINE FOR MAKING CAPSULES.
APPLICATION FILED JAN. 9, 1909.

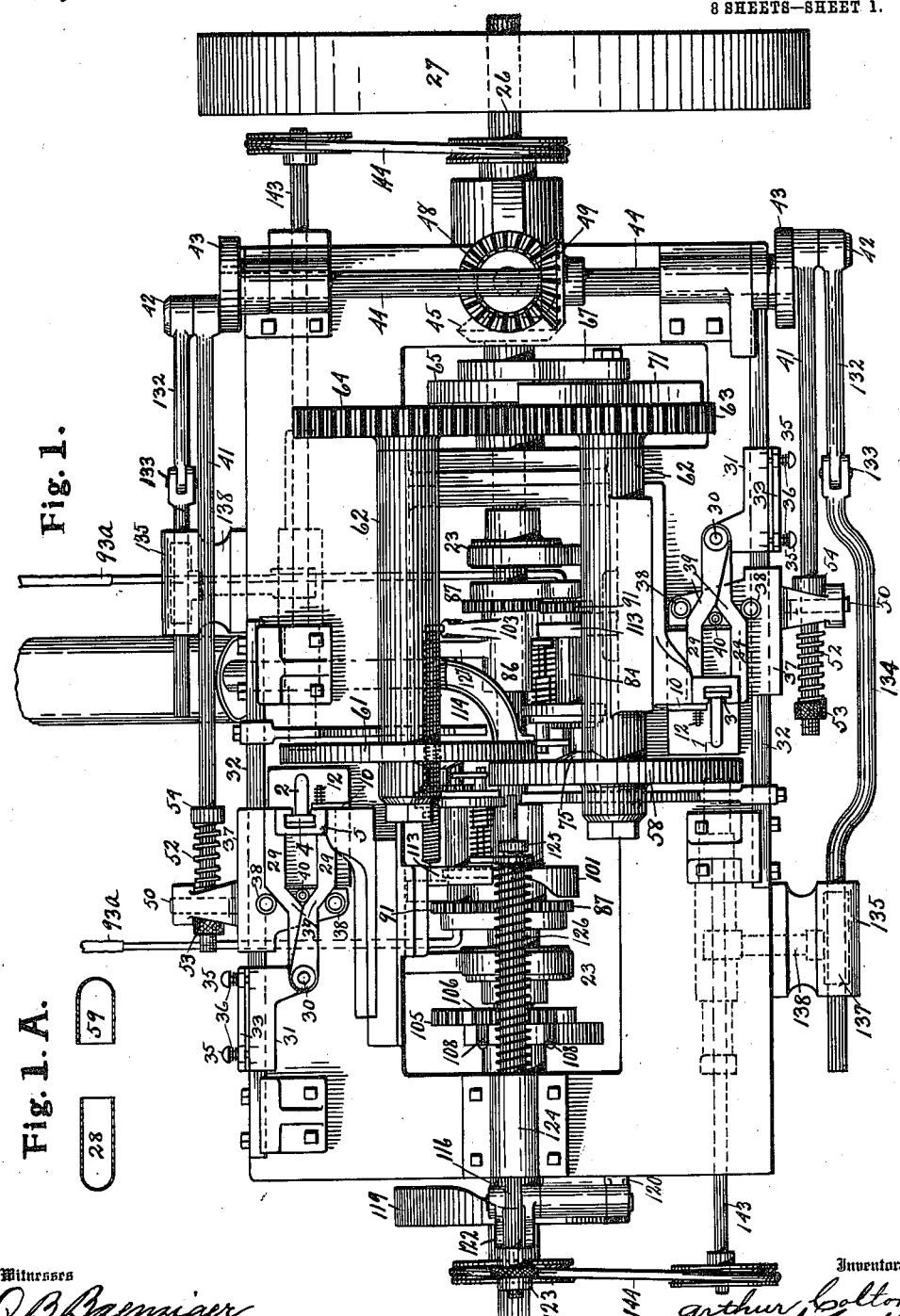

961,936.

Patented June 21, 1910.
8 SHEETS—SHEET 2.

Witnesses
O. B. Baenziger
J. G. Howlett

Inventors
Arthur Colton
Burton W. Scott
By E. S. Wheeler & Co.
Attorneys

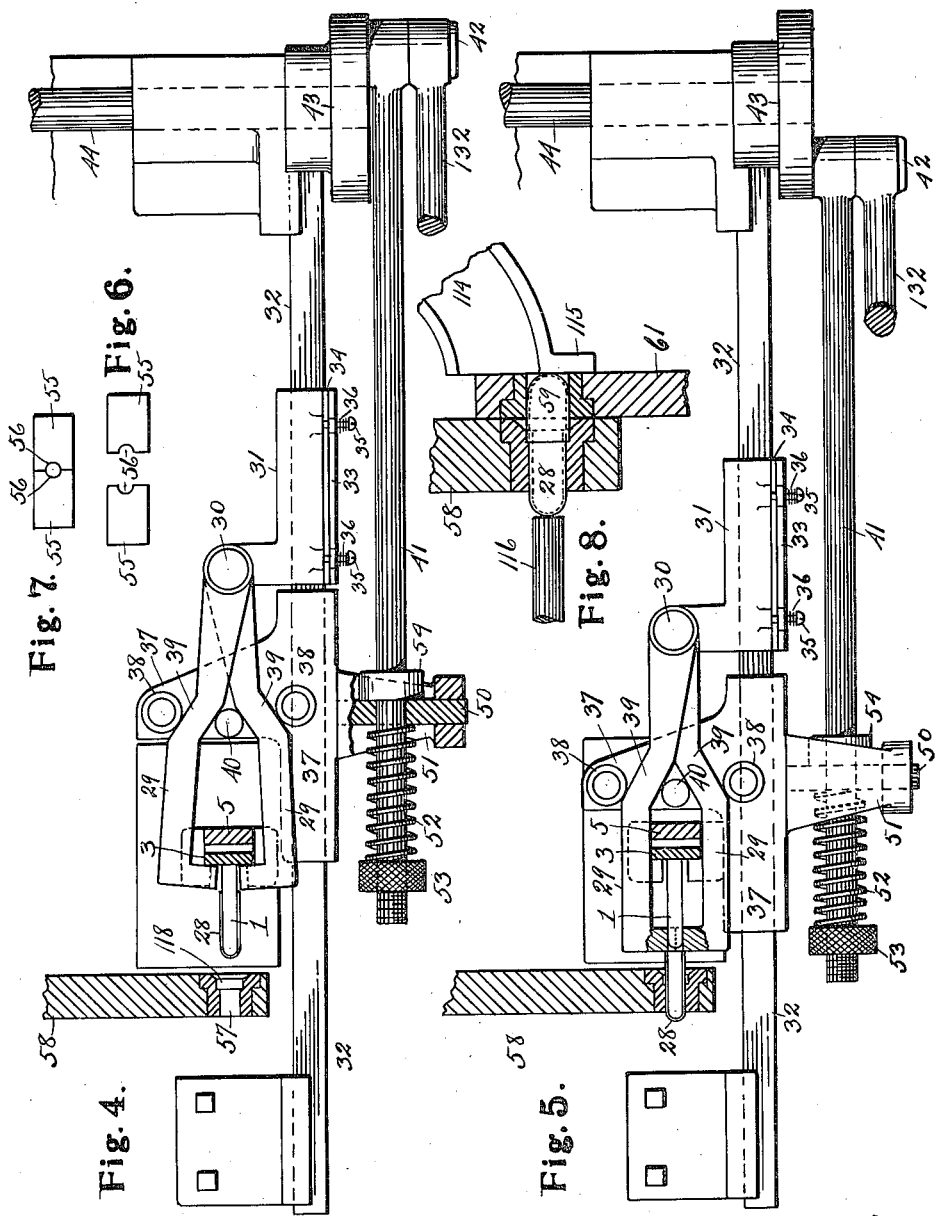

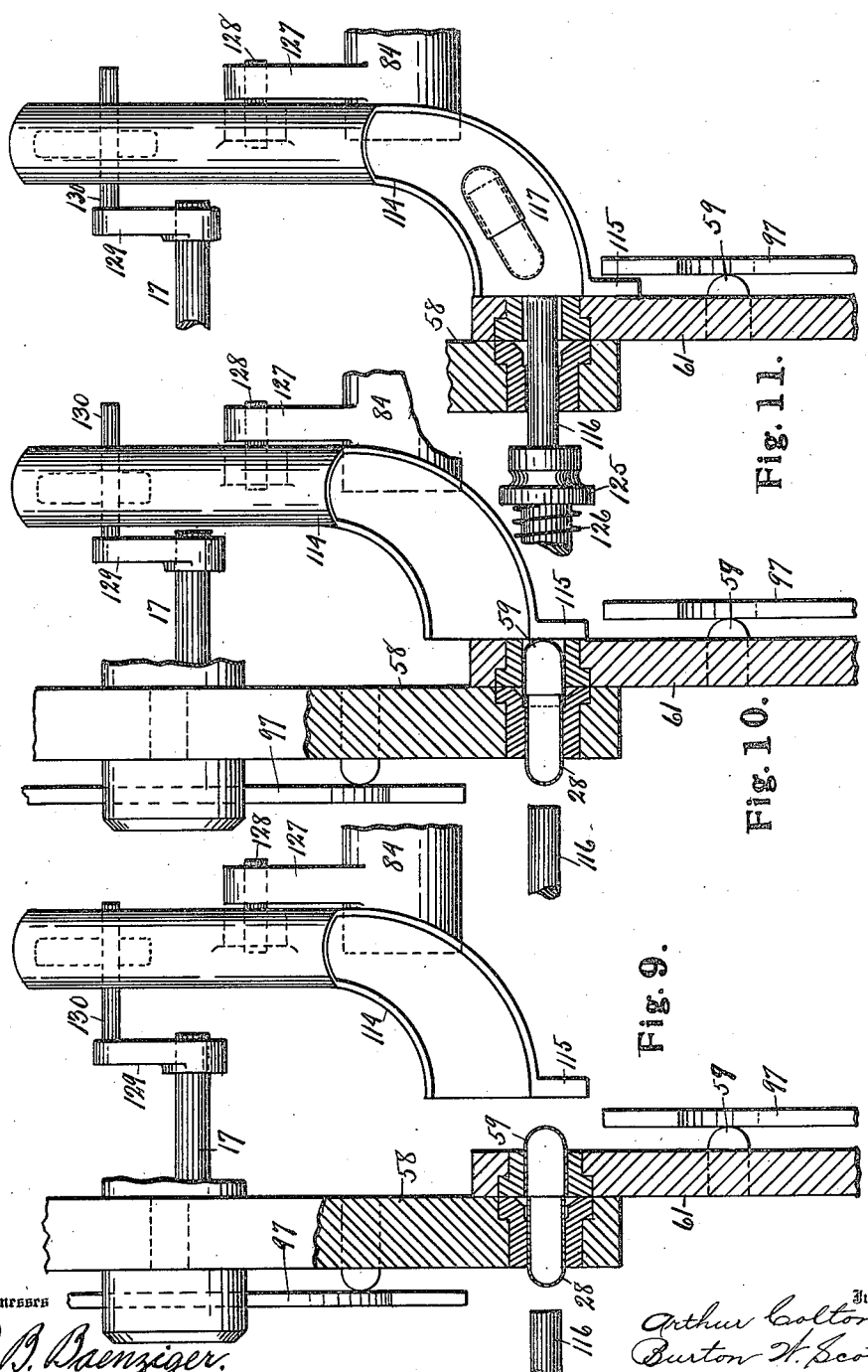

A. COLTON & B. W. SCOTT.
MACHINE FOR MAKING CAPSULES.
APPLICATION FILED JAN. 9, 1909.
961,936.
Patented June 21, 1910.
8 SHEETS—SHEET 6.
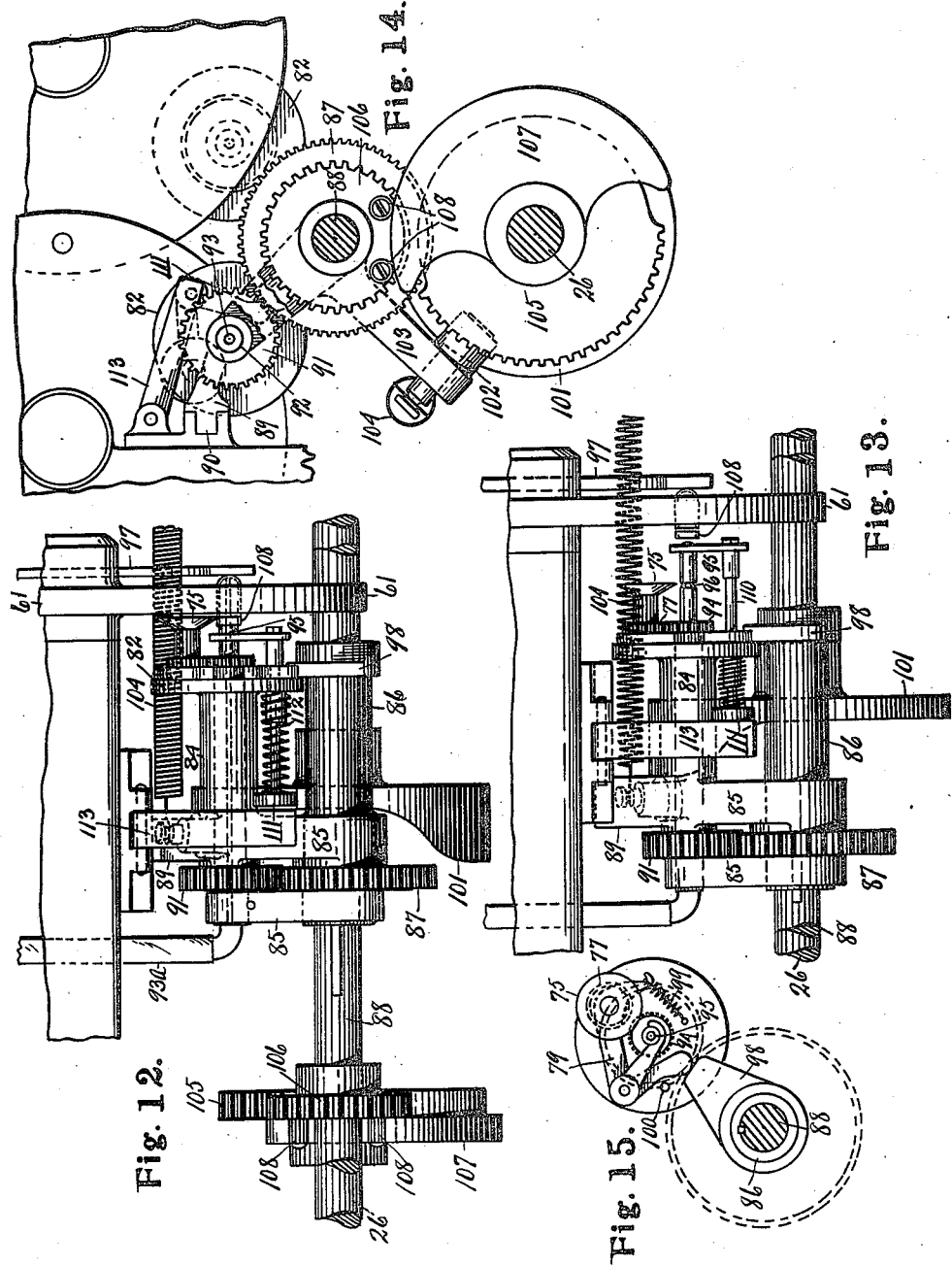

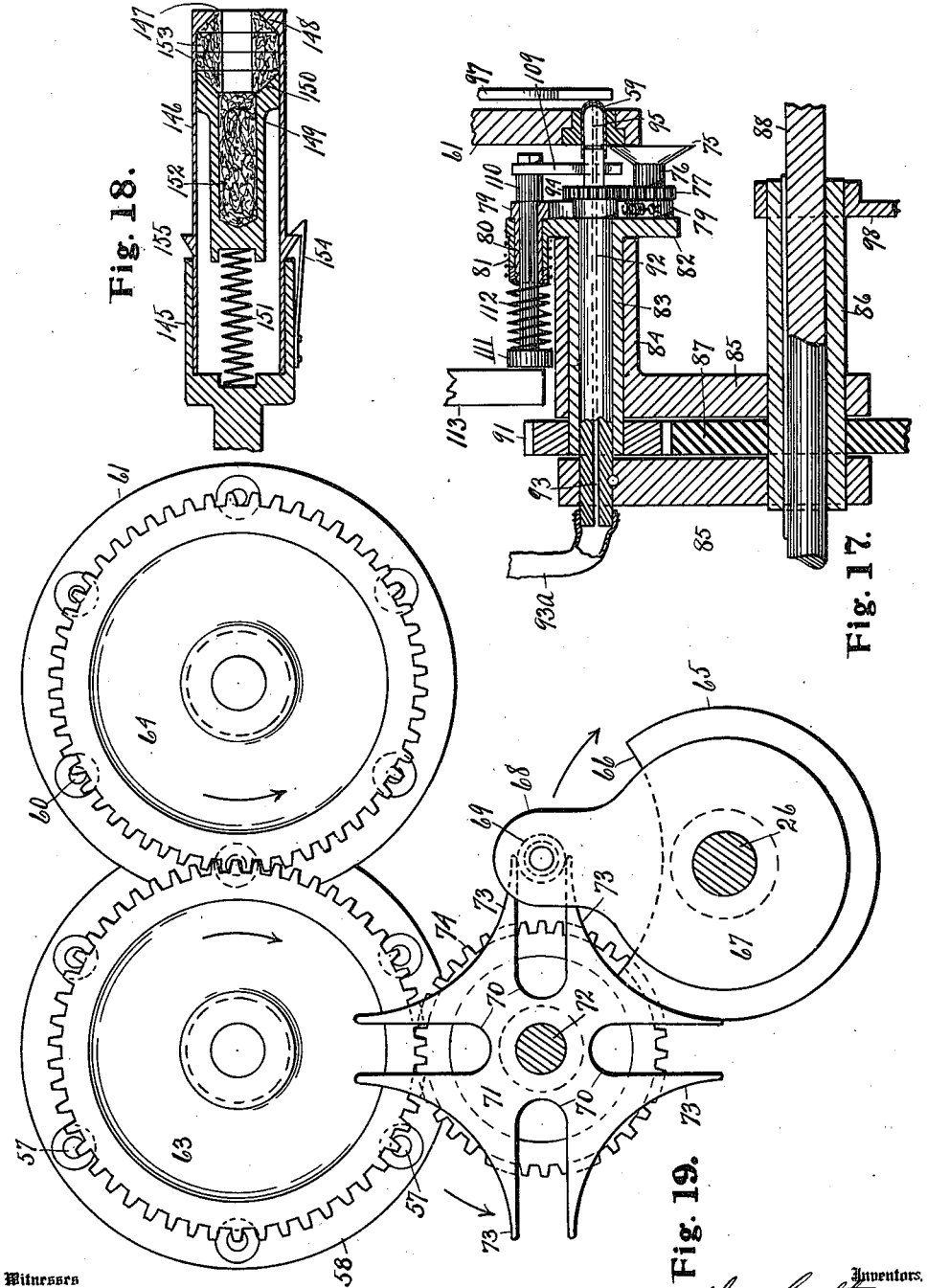

A. COLTON & B. W. SCOTT.
MACHINE FOR MAKING CAPSULES.
APPLICATION FILED JAN. 9, 1909.
961,936.
Patented June 21, 1910.
8 SHEETS—SHEET 8.
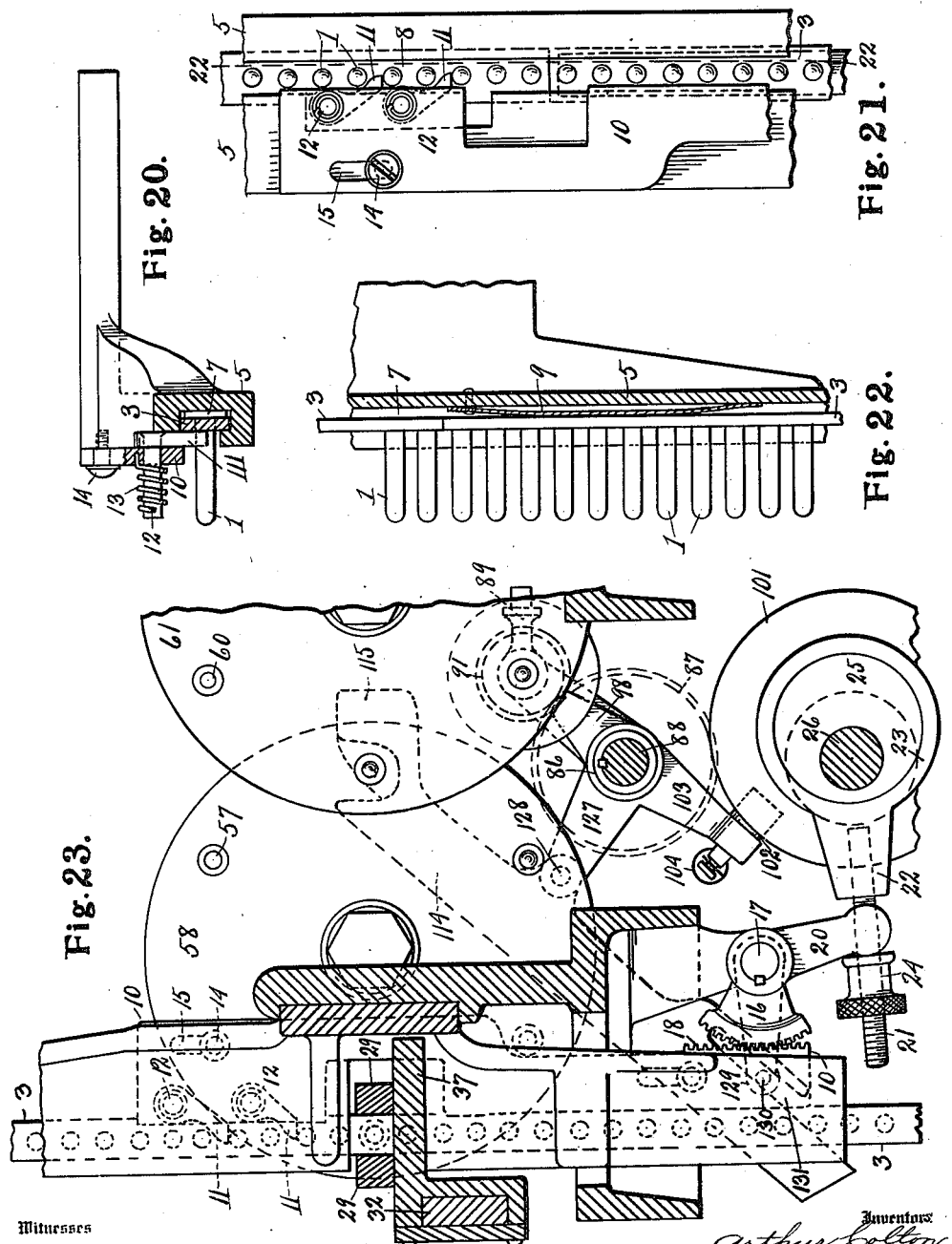

UNITED STATES PATENT OFFICE.

ARTHUR COLTON AND BURTON W. SCOTT, OF DETROIT, MICHIGAN, ASSIGNORS TO ARTHUR COLTON CO., OF DETROIT, MICHIGAN, A CORPORATION OF MICHIGAN.

MACHINE FOR MAKING CAPSULES.

961,936.    Specification of Letters Patent.    Patented June 21, 1910.

Application filed January 9, 1909. Serial No. 471,407.

*To all whom it may concern:*

Be it known that we, ARTHUR COLTON and BURTON W. SCOTT, citizens of the United States, residing at Detroit, in the county of Wayne, State of Michigan, have invented certain new and useful Improvements in Machines for Making Capsules; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a capsule machine, and consists in the construction and arrangement of parts hereinafter more fully set forth and pointed out particularly in the claims.

The primary object of the invention is to produce a machine of the character described, wherein the arrangement is such as to facilitate the feeding of the bodies and caps of the capsules into the machine upon the molding pins, on which they are formed, stripping the bodies and caps from said pins, and trimming them to render them the proper size, joining the bodies and caps and discharging the completed capsules from the machine.

A further object is to provide means for greasing the pins after the bodies and caps have been removed therefrom.

A further object is to produce efficient stripping and trimming devices and to provide simple and efficient means for driving the several groups of operative parts in timed relation to attain the results desired. The above objects are accomplished through the operation and association of the mechanical parts illustrated in the accompanying drawings, in which:—

Figure 16:
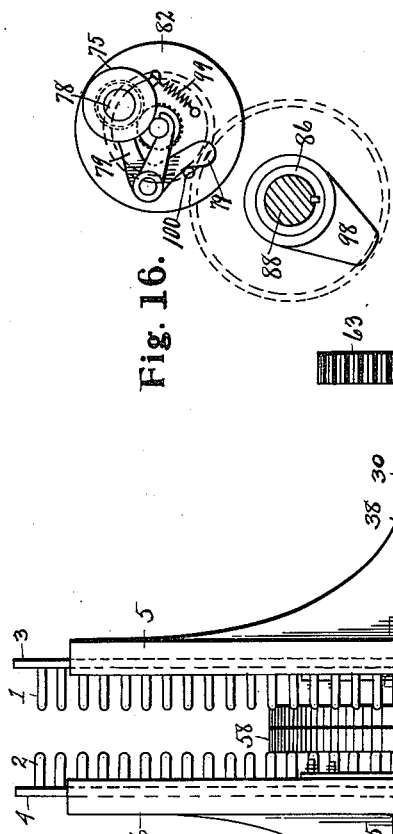
Figure 2:
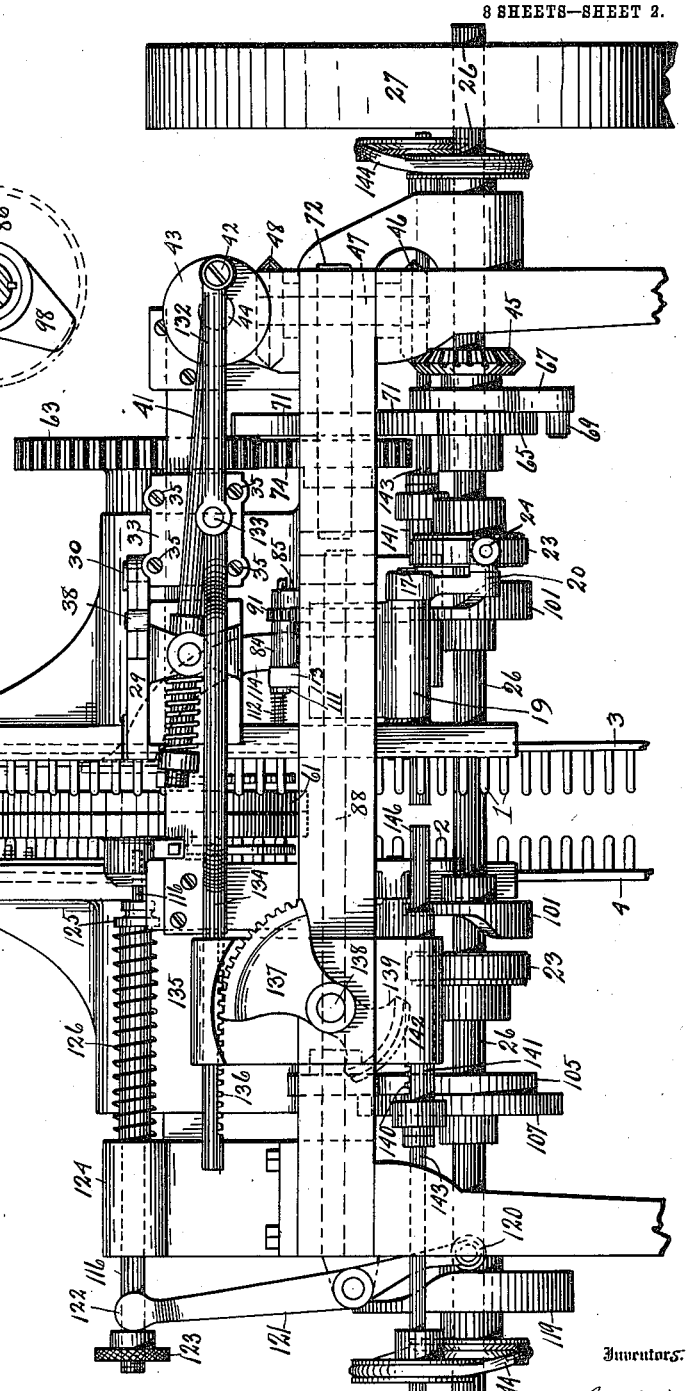
Figure 3:
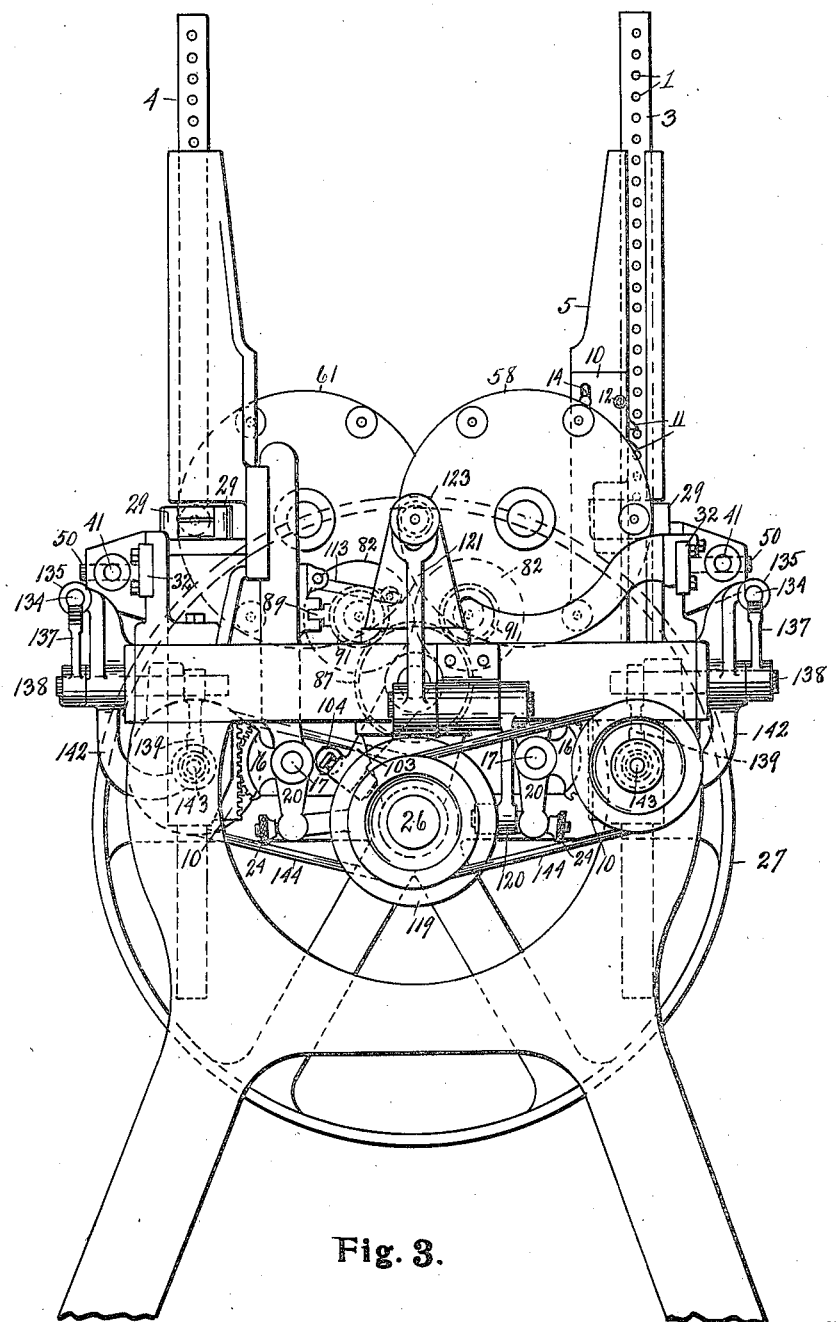

Figure 1 is a plan view of a machine embodying our invention. Fig. 1A is a sectional view of the body and cap of a capsule disjoined. Fig. 2 is a front elevation of the capsule machine. Fig. 3 is an end elevation thereof. Fig. 4 is a fragmentary view partly in horizontal section showing the means for stripping the caps and bodies from the molding pins, and directing them into the receiving sockets in the carrier disks, wherein said parts are trimmed and joined. Fig. 5 is a similar view showing the position of the parts at the moment the cap or body is removed from the molding or forming pin and directed into a registering socket in the carrier disk. Fig. 6 is an elevation of the jaw members which strip the bodies and caps from the mold pins, showing said jaws open. Fig. 7 is an elevation showing said jaws closed, as when embracing said pin. Fig. 8 is a fragmentary view partly in section, showing the lapping portions of the carrier disks and the body and cap of a capsule in the registering sockets thereof respectively, the parts being shown in the position they occupy at the instant of joining the body and cap, and just prior to the discharge of the completed capsule from said disks. Fig. 9 is a fragmentary view, partially in horizontal section, showing the lapping portions of the carrier disks and the body and cap of a capsule in the registering sockets of said disks, illustrating the position of the parts prior to the operation of joining the cap and body. Fig. 10 is a similar view illustrating the initial movement in the operation of joining the parts of the capsule. Fig. 11 is a similar view showing the position of the parts at the instant the joined capsule is discharged into the receiving chute. That a better understanding of the views may be had, it is suggested that the position of the parts shown in Fig. 8 be understood as intervening between the positions shown in Figs. 10 and 11. Fig. 12 is a fragmentary view showing a top plan of the trimming mechanism in the operation of trimming. Fig. 13 is a similar view showing the position of said parts at the instant the trimmed end is stripped from the pin which enters the part of the capsule being operated upon and lies therein during the operation of trimming. Fig. 14 is an end elevation of the trimming mechanism, portions of the carrier disks being broken away, and the shafts appearing in cross section. Fig. 15 is a view of a portion of the trimming mechanism, showing the position of the trimming knife when out of gear and removed from the path of the capsule part. Fig. 16, (Sheet 2), is a similar view, showing the position of the trimming knife when in gear and in the operation of cutting. Fig. 17 is a fragmentary view in section through the cutting mechanism, showing said parts in the operation of trimming a capsule body or cap. Fig. 18 is a sectional view through the rotary head which embraces in succession the mold pins and greases said pins after the caps and bodies have been stripped therefrom. Fig. 19 is an elevation of the timing or indexing mechanism which controls the intermittent rotation of the carrier disks. Fig. 20 is a horizontal section through the vertical guide way in which the pin bars are fed into the machine, showing one of the spring-actuating pawls mounted on the vertically reciprocatory slide for feeding said pin bars. Fig. 21 is a fragmentary view in side elevation showing two of the pin bars in the guide way in the position as when being fed into the machine. Fig. 22 is a sectional view as on line 22—22 of Fig. 21. Fig. 23 is a fragmentary view partly in section showing the mechanism for actuating the bars carrying the mold pins to feed them intermittently into the machine and for actuating the discharge spout.

In effecting an embodiment of our invention in an operative machine, as shown herein, we found it desirable to mount the mold pins 1 and 2 (whereon the bodies and caps respectively of the capsules are formed by dipping said bodies in a bath of gelatin, as will be well understood in the art) in bars 3 and 4 of suitable length, wherein said pins are arranged in perfect alinement and are spaced the requisite distance from one another. These bars are introduced respectively into vertical guides 5 and 6 arranged on opposite sides of the machine and carried by the frame thereof, wherein said bars are fed intermittently and simultaneously downward in pairs to present the projecting pins in each sequentially in position to permit the stripping therefrom of the bodies and caps of the capsules and the introduction of said bodies and caps into their respective receiving sockets in the carrier disks.

As the mechanism for feeding the pin bars 3 and 4 downwardly in their respective guides 5 and 6 is the same, the explanation of the construction and operation of said mechanism will be made with reference to that set employed in feeding the bars 3 downwardly in the ways 5, with the understanding that said description applies also to the mechanism employed for feeding the bars 4 in the guide 6.

On referring to Figs. 20 to 23 inclusive, it will be seen that the guide 5 is provided with a rectangular way 7 therein, said guide having in one of its faces a vertical slot through which project the pins 1 when the bar 3 is introduced into said way at the upper end thereof. Within the way 7 is a flat curved spring 9 (see Fig. 22) which forces the bar outwardly and causes it to bear with considerable friction against the margins of the slot, thereby preventing the bar feeding by gravity. To effect an intermittent feeding of the pin bar, a reciprocatory slide 10 is employed which is mounted upon the face of the guide near the lower end thereof and which carries upon its inner face the pawls 11 located one above the other, upon short shafts 12 journaled in said slide. Said shafts project from the face of the slide and are embraced by coiled springs 13 the outer ends of which are secured to said shafts and the inner ends to the slide. These springs exert a pressure upon the pawls to swing them outwardly into the path of the pins 1. As the slide 10 moves upwardly, said pawls slip past the pins and engage above them so that upon a downward movement of said slide the pin bar is carried downwardly a distance equal to the travel of said slide through the engagement of said pawls with the pins of said bar. To confine the slide 10 in place during this vertical movement, a screw bolt 14 is passed through a slot 15 therein into the guide 5.

A vertically reciprocatory movement is imparted to the slide 10 through the medium of a sector gear 16 (see Fig. 23) mounted upon a rock shaft 17 and meshing with a rack 18 formed on the lower end of the slide 10. The rock shaft 17 is supported in a bearing 19 on the frame, as shown in Fig. 2, and fixed to the opposite end of said shaft from that carrying the sector gear 16 is a crank arm 20 the outer end of which freely embraces a pin 21 projecting from the boss 22 of the eccentric strap 23 and confined between said boss and an adjusting nut 24 threaded upon the end of said pin. The eccentric 25 embraced by said eccentric strap is fixed to the main shaft 26, which extends longitudinally of the frame of the machine and is suitably journaled therein. The rotation of the shaft 26 actuates the crank arm 20 and imparts a reciprocation to the sector gear 16 which in turn imparts a vertical reciprocatory movement to the slide 10. By adjusting the nut 24 the throw of the crank arm 20 may be regulated. The main shaft 26 is driven through the medium of a belt pulley 27 carried on one end thereof.

As the slide 10 is actuated, the pin bar 3 is fed downwardly for each downward movement of said slide a distance equal to the spaces between the pins 1, so that the pins in said bar carrying the capsule bodies 28 are sequentially presented between the stripping jaws 29 embracing the guide 5, which at that point is reduced in transverse area to permit of the closing of the jaws around it, as shown in Figs. 4 and 5. The rear ends of the jaws 29 are pivotally mounted at 30 upon a bracket projecting from a slide block 130

31 mounted upon a rectangular bar 32 which passes through said block. The block 31 is adapted to slide upon said bar but is mounted to move with considerable friction thereon, because of a clamping plate 33 which is held forcibly against an interposed strip of leather 34, confined between said plate and one face of the bar 32 by means of the screws 35 having embracing springs 36 which bear against said plate. Also mounted to slide upon the bar 32 is a head 37 carrying the antifriction rollers 38 adapted to engage the outer faces of the inclined portions 39 of the pivoted jaws and close said jaws when said head is moving toward the left. Mounted in the head 37 between the inner faces of the inclined portions 39 of said jaws is a pin 40 which engages said inclined faces to open said jaws when the head 37 is moving toward the right. Motion is transmitted to the head 37 through the medium of a connecting rod 41. One end of the rod 41 is journaled on a pin 42 projecting from the face of the disk 43 fixed to the end of a transverse shaft 44 suitably journaled in the frame and driven from a beveled gear 45 on the main shaft which meshes with a like gear 46 on the lower end of a vertical shaft 47. The upper end of said vertical shaft carries a beveled gear 48 which meshes with a beveled gear 49 on the shaft 44. The outer end of the connecting rod 41 passes freely through the flattened central portion of a short shaft 50 journaled at its ends in a bracket 51 projecting from the head 37. The end of the rod 41 projects some distance through the flattened portion of said shaft and receives a coiled spring 52 confined thereon by an adjusting screw 53. A collar 54 fixed to the connecting rod 41 bears forcibly against the flat face of the shaft 50 so that on the forward stroke of the connecting rod, the head 37 is positively driven. Upon the return stroke of said rod the spring 52 carries the strain and compensates for any obstruction to the movement of the parts. The inwardly projecting end portions 55 of the jaw members are each provided in the inner face thereof with a half round channel 56 which forms a complementary portion of a circular aperture when said end portions of the jaws are brought together, as shown in Fig. 7. This aperture formed between the closed faces of the end portions of the jaw members is adapted to embrace the pins as the jaws are closed and to strip the bodies 28 of the capsules from said pins as the head 37 moves forward, at the same time shoving said bodies into the sockets 57 in the rotary carrier disk 58, as shown in Fig. 5, wherein the body portions of the capsules, by the rotation of said disk are presented to the trimming knife as hereinafter explained.

The jaws 29 are opened and closed through the retarded travel of the block 31 on the bar 32 which will be explained as follows:— Assuming that the parts are in the position shown in Fig. 4, as the head 37 moves forward the antifriction rollers 38 carried thereby will engage the outer faces of the inclined portions 39 of said jaws and swing said jaws together upon the pin 1 because of the fact that said jaws are pivoted to the friction block 31 which does not start with the initial forward movement of the head 37. When said jaws shall have been closed upon the pin so that the inner faces of the end portions 55 meet, no further movement of said jaws upon their pivot being permitted, the engagement of the rollers 38 with the inclined faces of said jaws will then cause the jaws to travel with the head 37 and draw the block 31 along the bar 32. Upon the return movement of the head 37 the pin 40 lying between the inner faces of the inclined portions of the jaws will cause said jaws to open as said head starts to move rearwardly. When the jaw members shall have reached the limit of their outward movement, they will be locked against the rollers 38 and a further movement of the head 37 will cause the block 31 to slide rearwardly, thereby returning the parts into position for a succeeding operation.

It will be understood that during the operation just described of stripping the bodies of the capsules from the pins and placing them in the sockets of the carrier disks 58, a similar operation is taking place upon the opposite side of the machine with respect to the caps 59 of the capsules which are in like manner stripped from the pins 2 by a duplicate set of operative parts and deposited in the sockets 60 of the rotary carrier disk 61.

The carrier disks 58 and 61 are mounted to rotate in opposite directions upon shafts journaled in the bearing supports 62 carried by the frame. Upon the end of the shaft of the disk 58 is a gear wheel 63 which meshes with a like gear 64 on the shaft of the disk 61. Through the medium of said gears said disks are driven in unison and in unvarying relation. It will be noted that said disks are offset with respect to one another and that their inner peripheries lap. Said disks are so positioned and are so driven intermittently as to cause the sockets therein to register or stand in horizontal alinement at the termination of each concurrent partial rotation. Said carrier disks are driven by the gears 63 and 64 from the main shaft through the medium of the operative parts shown in Fig. 19, comprising a disk 65 fixed on the main shaft 26, and having a portion of its periphery cut away in the arc of a circle, as shown at 66. The hub 67 of said disk is provided with a projecting arm 68 carrying an antifriction roller 69. This roller is adapted to successively engage in the radial slots 70 of a star-wheel 71 fixed on a stub shaft 72 journaled in the frame. The periphery of said star-wheel between the slotted arms, or points thereof is curved inwardly, as shown at 73, in the arc of a circle concentric with the periphery of the disk 65. Also fixed to the shaft 72 is a pinion 74 which meshes with the gear 63. As the disk 65 revolves, the antifriction roller on the arm of the hub thereof will enter one of the slots 70 in the star-wheel and turn said wheel one quarter of a revolution. The point or arm of the star-wheel having the slot in which said roller is engaged, entering and leaving the concaved portion 66 of the periphery of said disk during said movement. As the roller 69 passes from engagement in each of the slots 70 in succession, the circular margin of the disk 65 moves into engagement with the curved surface 73 between the points of the star-wheel and locks said wheel against movement during its period of rest. By this arrangement, a partial rotary movement is intermittently imparted to the star-wheel and the pinion 74 during each complete rotation of the shaft 26, said rotary movement being equal to one quarter of the circumference of said pinion, whereby there is imparted an intermittent rotation to the gears 63 and 64 and a corresponding movement to the disks 58 and 61 carried on the shafts of said gears, which movement is equal to one sixth of the circumference of said disks, or the distance between the capsule receiving sockets therein, said disks between their periods of rotation being firmly locked against movement in either direction.

During each period of rest, the bodies and caps of the capsules are stripped from the mold pins and deposited in the respective sockets of said disks, as before described. The next movement of said disks carries the capsule body and cap to the trimming mechanism whereby said caps and bodies are trimmed to the desired length. The sets of trimming mechanism, of which there are two, of identical construction, arranged to operate simultaneously upon the caps and bodies of the capsules, will be described with reference to one set only, as the description of one set will answer for the other.

Referring now more particularly to Figs. 12 to 17 inclusive, 75 designates a circular knife having a flat face, which, when in operation, stands contiguous to the face of the carrier disk, as clearly shown in Fig. 17. Said knife is mounted upon the outer end of the sleeve 76 carrying at its opposite end a pinion 77, and said knife, sleeve, and pinion are mounted to rotate upon a journal pin 78 fixed in the end of one of the arms of a bell-crank lever 79. Said bell-crank lever is mounted upon a hollow journal 80 which is received to oscillate within a sleeve 81 extending rearwardly from the circular face plate 82 carried at one end of the hollow shaft 83 which is journaled in a horizontal bearing 84, said bearing being a part of a horizontally reciprocatory frame or carriage in which the trimming mechanism is mounted, comprising in addition to said bearing the laterally and downwardly extending hangers 85 in the ends of which is journaled the sleeve 86 carrying a gear wheel 87, said sleeve being splined upon the horizontal shaft 88. Forming a part of the reciprocatory trimmer frame or carriage is a head 89 (see Fig. 14) which is adapted to slide in a way 90 on the main frame, whereby one side of the trimmer carriage is supported and guided in its reciprocatory movement, the other side of said carriage being supported by the hangers 85 which embrace the sleeve 86 slidable upon the shaft 88 and rotatable therewith. The gear 87 meshes with a pinion 91 which is fixed to one end of the hollow journal 83. Passing through the outer hanger 85 and through the hollow shaft 83 is a non-rotative shaft 92 having a central longitudinal aperture 93 therethrough. The inner end of said shaft passes through the center of the face plate 82 and carries thereon a pinion 94 which meshes with the pinion 77 of the rotary cutter 75.

Extending from the end of the shaft 92 in axial alinement therewith is a pin 95 through which the aperture 93 is continued, said pin being of a diameter to enter the body or cap of the capsule so as to fill said cap or body during the operation of trimming. Formed in said pin at the requisite distance from the end thereof is a circumferential channel 96, shown more clearly in Fig. 13, in which the edge of the knife is adapted to enter during the operation of trimming to afford a shearing action for the rotary knife when severing the end of the capsule body or cap upon said pin. The aperture 92 which passes through the fixed shaft 92 and through the pin 95 is for the purpose of directing an air blast therethrough from the air hose 93ª which blows into the cap or body and prevents it crawling on the pin while being cut. A circular guard 97 is located adjacent the face of the carrier disk against which the closed ends of the caps or bodies bear to prevent their being blown from the pin 95 by the air blast during the operation of trimming and to maintain them in proper position in the socket of the carrier disk while passing from the stripping jaws to the trimmer knife. It will be noted that in order to permit the pin 95 to enter the cap or body of the capsule preparatory to the operation of trimming, the knife 75 must be moved from contact with said pin except during the period said knife is in actual operation. To actuate the bell-crank lever 79 and carry the knife from contact with said pin, a cam 98 is employed which is mounted on the sleeve 86 to rotate therewith and which is so positioned as to engage the free end of the bell-crank lever, as shown in Fig. 15, to swing said lever on its fulcrum and raise the knife from the pin 95 during the time said knife is not in operation, said cam passing from engagement with the end of the bell-crank lever after the pin shall have entered the capsule to permit the knife to drop upon the protruding end of the capsule part as said knife starts to rotate and to travel in a circle around said pin in the operation of trimming. A spring 99 (see Figs. 15 and 16) is attached to the end of the bell crank lever 79 and returns the knife into working relation with the pin 95 when the cam 98 passes from engagement with said lever. A stop pin 100 projecting from the face plate 82 arrests the return movement of the bell-crank lever to prevent the knife being drawn into forcible engagement with the bottom of the channel 96 in said pin.

A sliding movement in one direction is imparted to the carriage carrying the trimming mechanism by means of the cam disk 101 mounted on the main shaft 26 and adapted to engage with the high point thereof, as the main shaft rotates, an antifriction roller 102 on an arm 103 (see Fig. 14) extending downwardly from the carriage of the trimming mechanism, whereby said carriage and the mechanism mounted therein is moved to the left to withdraw the pin 95 from the body or cap of the capsule and the cutter 75 from the face of the carrier disk. The coiled spring 104 which is attached to the arm 103 of the trimmer carriage, slides said carriage in the opposite direction when the high point of the cam 101 passes from engagement with the antifriction roller 102. It will be noted that said spring 104 is attached at its opposite ends to the arms 103 of the two sets of trimming devices, whereby both sets are simultaneously actuated by said spring to return them into working relation with their respective carrier disks at the proper time.

An intermittent rotary movement is imparted to the shaft 88 by means of a mutilated gear 105 mounted on the shaft 26 and meshing with the pinion 106 on shaft 88. The teeth of the mutilated gear 105 are formed upon one half of the periphery thereof and contiguous to said gear on the shaft 26 is a semicircular plate 107 whose periphery is concentric with the axis of the shaft 26 and is adapted to pass into engagement with the antifriction rollers 108 on the face of the pinion 106, at the time the teeth on the mutilated gear pass from engagement with the teeth of said pinion, whereby the shaft 88 is locked at the end of each period of rotation. There are a sufficient number of teeth upon the mutilated gear 105 to cause a complete rotation of the shaft 88 while the shaft 26 is making one half of a revolution, at which time the knife 75 is in position for trimming and is caused to revolve around the pin 95. Because of the fact that the shaft 92 does not rotate and that the pinion 94 thereon meshes with the pinion 77 on the sleeve of the cutter 75, said cutter is caused to rotate about its axis as it travels in a circle about the axis of the pin 95, thereby imparting thereto a planetary movement which renders it effective in severing the projecting end of the cap or body of the capsule, said effectiveness being increased by the fact that a two to one gear is employed for rotating the hollow shaft 83, whereby the knife is caused to make two complete revolutions around the pin 95.

The parts are so timed in their operation with relation to the intermittent movement of the carrier disk that during each period of rest of said disk a cap or body is introduced into a socket thereof and a cap or body previously introduced is trimmed, the disk in its movement presenting in succession an empty socket to the stripper to receive a capsule cap or body and a filled socket to the trimming mechanism that a cap or body may be acted upon thereby. At the cessation of each period of movement imparted to the carrier disk, a capsule cap or body is presented in alinement with the pin 95 at which time the slidable carriage in which the trimming mechanism is mounted is moved toward said disk so as to cause said pin to enter said cap or body and the rotary knife to stand adjacent the face of said carrier disk, when said knife is caused to move into engagement with the projecting end of the cap or body of the capsule and is rotated upon its axis and carried in a circle twice around said pin, whereby said cap or body is trimmed to render it the required length.

In order to remove from the pin 95 the end portion 108 trimmed from the cap or body, a stripper is provided in the form of a laterally projecting arm 109, (see Fig. 17) which extends from the end of a shaft 110 mounted to slide longitudinally through the journal 80 which forms the fulcrum of the bell-crank lever 79, said shaft carrying upon its outer end a collar 111 between which and the rear face of the rotary plate 82 is confined a spring 112 which surrounds the projecting end of the shaft 110. As the carriage of the trimming mechanism is moved away from the face of the carrier disk after the operation of trimming, the fixed arm 113 which projects from the frame in the path of the collar 111 on the end of the shaft 110, will prevent said shaft 110 returning with the carriage, whereby the pin 95 is caused to draw across the arm 109 and strip from the pin the trimmed end portion 108 of the capsule part. The spring 112 which is compressed during this movement, retracts the shaft 110 when the carriage again moves forward to place the stripping arm 109 in position for a succeeding operation.

From the sets of trimming machines, the caps and bodies of the capsules in their respective carrier disks are presented to the joining device, at which time the sockets in the lapping faces of the carrier disks 58 and 61 are caused to register or stand in the same horizontal plane, as clearly shown in Figs. 8 to 11 inclusive, wherein Fig. 9 illustrates the position of the parts at the inception of the joining operation, showing the open end of a body of a capsule in a socket of the disk 58, registering with the open end of a cap in a socket in the disk 61, in which position of parts the reciprocatory and pivotally mounted spout 114 is actuated, by means hereinafter explained, to cause the projecting foot 115 thereon to engage the end of the cap 59 and force said cap inwardly onto the open end of the body, as shown in Fig. 10. This operation only partially completes the joining of the cap and body, and to complete the joining operation a reciprocatory plunger 116, actuated by means hereinafter explained, moves against the projecting end of the body and crowds it into the cap, as clearly shown in Fig. 8, Sheet 4. At this time the spout is so actuated as to cause the foot 115 thereof to pass from in front of the socket in the disk 61 in which the cap is confined and permit the plunger 116 which continues its forward movement to discharge the completed or joined capsule 117 into the opening of the spout 114 through which it is conveyed away.

It will be noted on referring to Fig. 4, Sheet 4, that the sockets 57 in the disk 58 are counterbored, as shown at 118, to facilitate the passage of the end of the cap upon the end of the body held therein.

The plunger 116 is actuated to retract it from the registering sockets in the carrier disks, after discharging the joined capsule, by means of a cam wheel 119 on the main shaft 26, the high point of which is adapted to engage an antifriction roller 120 in the lower end of a lever 121 fulcrumed at the end of the frame and provided at its upper end with a fork 122 which embraces the projecting rear end of said plunger and bears against an adjusting nut 123 which is threaded thereon, as clearly shown in Fig. 2. Said plunger is mounted to reciprocate in a bearing 124 on the frame and surrounding said plunger between said bearing and the collar 125 on the inner end thereof is a compressible spring 126. As said plunger is retracted by the cam 119 this spring is compressed so that when the high point of said cam passes from engagement with the antifriction roller 120 in the lever 121, the force of said spring will return the plunger and cause it to discharge the joined capsule from the registering sockets in the carrier disks. The operation of said plunger is so timed with respect to the intermittent movement of the carrier disks that an actuation thereof to eject the joined capsules, occurs during each period said disks are at rest.

The spout 114 is caused to reciprocate in a horizontal plane by means of an arm 127 projecting from the traveling carriage of one of the trimming sets and pivotally connected at 128 to said spout, as clearly shown in Figs. 9, 10, 11, and 23. As said carriage reciprocates, the spout 114 is carried with it so that the receiving end of said spout is successively presented to and withdrawn from the face of the carrier disk 61. A tilting movement in addition to the horizontal reciprocatory movement is imparted to the spout through the medium of a crank arm 129 (see Fig. 23) mounted on the rock shaft 17, said crank arm carrying a pin 130 which engages in a slot 131 on the under side of said spout at its lower end. Said rock shaft is so actuated as to tilt the spout on its pivot 128 at the instant the cap and body of the capsule are joined, as shown in Fig. 8, Sheet 4, so as to move said foot portion of the spout from in front of the registering sockets in the carrier disks and present the spout in alinement therewith to receive the discharged capsule, as shown in Fig. 11, Sheet 5.

After the capsule caps and bodies shall have been stripped from the mold pins, it is necessary before said pins are again dipped in the gelatin bath to mold additional caps and bodies thereon, that they be oiled or greased to prevent the caps and bodies sticking thereto. In order to obviate an extra handling of the pin bars for this purpose, we have provided two mechanically actuated pin greasing devices which operate upon the pins of the caps and bodies respectively to grease them after the caps and bodies have been stripped therefrom and while the pin bars are passing vertically through the machine. The description of the construction and operation of the pin greasing devices will be made with reference to one of said devices, only, because of the fact that said devices are identical and operated in unison in exactly the same manner. On referring to Figs. 1 and 2, it will be seen that mounted upon the pin 42 of the disk 43 on which the connecting rod 41 is journaled, is also journaled a pitman 132 pivotally connected at 133 with one end of a reciprocatory rod 134 whose opposite end is mounted to slide in a guide 135 and is provided on its under face with rack teeth 136 which mesh with the teeth of a sector gear 137 mounted upon one end of a transverse rock shaft 138. The opposite end of said rock shaft carries a sector gear 139, shown by dotted lines in Fig. 2, the teeth of which mesh with the teeth 140 on the upper side of a longitudinally reciprocatory and non-rotative rack 141 which is supported to slide in the end of a downwardly extending bracket 142.

Journaled in the reciprocatory rack 141 and adapted to move therewith is a shaft 143 driven by a belt 144 which passes over grooved pulleys on the ends of the shafts 26 and 143 respectively. At the inner end of the rotary and longitudinally reciprocatory shaft 143 is a socket 145 (see Fig. 18, Sheet 7) in which is seated a hollow cylindrical head 146 having a central opening 147 in the end thereof surrounded within said head by an inclined annular wall 148. Located within the head 146 is a socket plunger 149 having a flaring opening 150 at the outer end thereof and engaged at its rear end by a compressible spring 151. Packing 152 saturated with grease is placed in the socket of the plunger 149 and greased packing rings 153 are placed between the flaring outer end of said plunger and the inclined annular wall 148 surrounding the opening through the end of said head. A spring latch 154 is mounted upon the socket member 145 and is adapted to engage an annular shoulder 155 upon the cylindrical head to detachably retain said head in said socket. The rotary and reciprocatory shaft 143 carrying the greasing head 146 is so positioned as to present said head in alinement with the vertical row of pins carried in the pin bar and is so timed in its movement with respect to the operation of the machine as to move forward when the pin bar is at rest. In this forward movement the head passes over the pin which enters the aperture in the end thereof, causing the greased packing within the head to embrace the pin, which as the head rotates, thoroughly greases not only the body of the pin, but the end thereof. As the head withdraws from the pin, the bar carrying the pin moves downwardly to present a succeeding pin in the path of said head which again moves forward to embrace said succeeding pin, the operation being intermittently timed so that the pins are sequentially greased as the pin bars move downwardly through the machine.

It will now be understood, that, by means of this machine, the caps and bodies of the capsules which are fed into the machine on the downwardly traveling pin bars, are stripped from said bars and placed in the receiving sockets of the carrier disks, presented by said disks to the trimming machines and trimmed, and by a further movement of said disks are brought into alinement in the registering sockets thereof wherein they are joined and the completed capsule discharged from said registering sockets.

The construction of the machine is of such a character that it may be driven at a comparatively high speed, thereby enabling the manufacture of a large number of capsules within a given time.

Having thus fully set forth our invention, what we claim as new and desire to secure by Letters Patent, is:—

1. A capsule machine comprising means for feeding into said machine the pins carrying the caps and bodies of the capsules, carrier disks having receiving sockets therein, means for stripping the caps and bodies from said pins and placing them in said sockets respectively, means for trimming said caps and bodies while in the sockets of the carrier disks, means for joining the caps and bodies in the registering sockets of said disks, and means for actuating the carrier disks in timed relation with the feeding, stripping, trimming, and joining means.

2. A capsule machine comprising a movable carrier having receiving sockets therein, a pin bar having a row of pins thereon carrying capsule parts, means for feeding said pin bar into the machine to successively present each pin thereon before a socket in said carrier, means for stripping the capsule parts from said pins and placing them in said sockets, means for moving the carrier with the movement of the pin bar to cause the sockets therein to successively register with the pins on said bar, and means for timing the operation of the stripping mechanism with respect to the movement of said carrier and the operation of the pin bar feeding means.

3. A capsule machine comprising a rotary carrier having receiving sockets, means for feeding into the machine a series of pins carrying one part of a capsule thereon, and means for stripping the capsule parts from said pins and placing them successively in the sockets of said rotary carrier, the feeding and stripping means being operated in timed relation with the movement of said carrier.

4. A capsule machine comprising two rotary carriers standing in opposed relation, each having a plurality of sockets therein, the sockets in said disks being caused to register in pairs as the disks revolve, means for feeding caps and bodies of capsules into the receiving sockets of said disks respectively, means for joining the caps and bodies in the registering sockets of said disks when said sockets move into alinement, and means for rotating said disks in unison.

5. A capsule machine comprising two rotary disks standing in opposed relation, each having a plurality of sockets therein, the sockets in said disks being caused to register in pairs as the disks revolve, means for feeding caps and bodies of capsules into the receiving sockets of said disks respectively, means for trimming the caps and bodies in said sockets, means for joining the capsule bodies in the registering sockets of said disks when said sockets move into alinement, and means for rotating said disks in unison.

6. A capsule machine comprising a movable carrier traveling intermittently in a fixed orbit and having a continuous row of sockets to receive capsule parts, a pin bar having a row of pins carrying capsule parts, means for feeding said pin bar longitudinally in a straight path to present the pins thereon in succession before the sockets in said carrier, means for feeding sequentially component parts of capsules from said pins into said sockets, and means for timing the operation of feeding the capsule parts into the sockets of the carrier with respect to the movement of said carrier and the feeding of said pin bar.

7. A capsule machine comprising an intermittently movable carrier having sockets for the reception of the component parts of capsules, means for actuating said carrier intermittently, means for feeding intermittently a plurality of pins into said machine having said capsule parts formed thereon, means for stripping the capsule parts from said pins and placing them in the sockets of the movable carrier, said stripping means comprising pivoted jaws adapted to successively embrace said pins and engage the end of the capsule part thereon and to move longitudinally of the pin to carry the capsule part into a socket of the movable carrier, and means for actuating the feeding and stripping mechanism intermittently in timed relation with the intermittently movable carrier.

8. A capsule machine comprising a movable carrier having sockets therein for the reception of the component parts of capsules, means for actuating said carrier intermittently, means for feeding intermittently into the machine a plurality of pins carrying said capsule parts, means for stripping the parts of the capsules from said pins, said stripping means comprising opposed hinged jaws, the working faces of said jaws having registering channels which embrace said pins, means for actuating said hinged jaws to successively close and open them, means for reciprocating said jaws, and means for actuating the stripping means in timed relation with the intermittent movement of said carrier.

9. A capsule machine comprising an intermittently movable carrier having sockets therein for the reception of component parts of capsules, means for feeding the capsule parts into the sockets of said carrier, means for trimming the capsule parts in said sockets, said trimming means comprising a reciprocatory pin which enters the open end of the capsule part, a rotary knife which describes a circle about said pin as said knife rotates, and means for actuating the trimming mechanism in timed relation with the intermittently movable carrier.

10. A capsule machine comprising an intermittently movable carrier having sockets for the capsule parts, mechanism for trimming said parts, means for actuating the carrier to successively present the sockets with a capsule part therein to the trimming mechanism, said trimming mechanism comprising a reciprocatory carriage carrying a filling pin adapted to enter the open end of the capsule part, and a rotary knife adapted to describe a circle around said pin as it rotates to sever the end of said capsule part, said knife being movable out of engagement with said pin except when in the operation of trimming, and means for reciprocating the carriage and for actuating the trimming mechanism.

11. A capsule machine comprising rotary carriers, each carrier having a plurality of sockets therein to receive the caps and bodies of the capsules, means for placing the caps and bodies of the capsules in the sockets of said carriers respectively, the marginal portions of said carriers lapping to cause the sockets therein to register as said carriers are rotated, means for arresting the movement of said carriers when the sockets in the lapping faces are in alinement, and means for joining the caps and bodies in said alined sockets.

12. A capsule machine comprising intermittently movable carriers, each of which is provided with a plurality of sockets for the reception of the caps and bodies of the capsules respectively, the marginal inner portions of said movable carriers lying contiguous and lapping so as to cause the sockets therein to successively register in pairs, means for introducing the caps and bodies of the capsules into the sockets of said carriers, and means for joining said caps and bodies in said registering sockets as said sockets are brought into alinement by the travel of said carriers.

13. A capsule machine comprising rotary carrier disks having sockets therein for the reception of the caps and bodies of the capsules respectively, said disks being so mounted as to cause their marginal portions to lap, means for rotating said disks intermittently to cause the sockets in the lapping faces thereof to register, means for trimming the caps and bodies while in the sockets of said disks, means for joining the trimmed caps and bodies in said registering sockets, and means for actuating said disks in timed relation with the operation of the trimming and the joining mechanism.

14. A capsule machine comprising movable carriers, having sockets therein, said carriers being so positioned as to cause the sockets therein to move into alinement during a portion of their travel, means for introducing the caps and bodies of the capsules into the sockets of the carriers respectively prior to the alining of said sockets, means for joining the caps and bodies as the sockets of the respective carriers are brought into alinement, and means for timing the operation of the joining mechanism with the intermittent travel of said carriers.

15. A capsule machine comprising movable carriers, having sockets therein, a part of said carriers standing in opposed relation during a portion of their travel to bring the sockets therein into alinement, means for introducing the caps and bodies of the capsules into the sockets of the carriers and trimming them therein prior to the alinement of said sockets, means for joining the caps and bodies as the sockets of the respective carriers are brought into alinement, and means for timing the operation of the joining and trimming mechanism with the intermittent travel of said carriers.

16. A capsule machine comprising a carrier disk having sockets therein, trimming mechanism comprising a reciprocatory carriage, a rotary knife mounted on said carriage, a pin projecting from the carriage and adapted to enter the sockets of the carrier, said knife being adapted to travel in a circle around said pin, and to rotate during said travel, means for raising the knife from the pin and returning it into contact therewith, means for reciprocating the carriage to successively carry the knife into close relation with the face of the carrier disk and to retract it therefrom, and means for intermittently actuating the carrier disk in timed relation with the operation of the trimming mechanism.

17. In a capsule machine, the combination with means for intermittently feeding a plurality of mold pins into the machine carrying a capsule part thereon, of means for stripping said parts from said pins in succession, and means for successively greasing said pins during their travel through the machine.

18. A capsule machine comprising a traveling carrier having receiving sockets, means for feeding into the machine a series of pins carrying a component part of a capsule thereon, means for stripping the capsule parts from said pins and placing them successively in the sockets of said traveling carrier, and means for trimming the capsule parts while in said sockets, the feeding, stripping, and trimming means being operated in timed relation with the movement of said carrier.

19. A capsule machine comprising a pair of traveling carriers, means for feeding capsule molds in pairs, each mold carrying a component part of a capsule, means for transferring capsule parts from the molds to the pair of carriers, said carriers having such operative relation that at a certain point in their travel a mating pair of component capsule parts will stand in axial alinement, means for trimming said capsule parts, means for imparting intermittent motion to said carriers, means for joining said alining component parts, and means for ejecting the joined parts from said carriers.

20. In a capsule machine the combination of a pair of movable carriers adapted to receive component parts of capsules, said carriers having such operative relation that at a point in their travel a mating pair of component capsule parts will stand in axial alinement, means for arresting the movement of said carriers at said alining point, and means for joining said alined capsule parts.

21. In a capsule machine comprising a pair of traveling carriers adapted to receive capsule parts, means for feeding capsule molds in pairs, each mold carrying a component part of a capsule, means for transferring said component capsule parts to the pair of carriers, said carriers having such operative relation that at a point in their travel a mating pair of capsule parts will stand in axial alinement, means for imparting intermittent movement to said carriers, means for joining said capsule parts when in axial alinement, and means for removing the joined capsules from said carriers.

22. In a capsule machine comprising a pair of traveling carriers adapted to receive capsule parts, means for feeding component parts of capsules to said pair of carriers, means for trimming said component parts while on the carriers, said carriers having such operative relation that at a point in their travel a mating pair of capsule parts will stand in axial alinement, and means for joining said component parts at said point of alinement.

23. In a capsule machine, a pair of carriers adapted to receive capsule parts, means for feeding component parts of capsules to the carriers, said carriers having such operative relation that at a point in their travel a mating pair of capsule parts will stand in axial alinement, means for imparting intermittent motion to said carriers, and means for joining said mating component parts at said point of alinement.

24. A capsule machine comprising a carrier adapted to receive component parts of capsules, traveling mold pins for presenting the capsule parts to said carrier, trimming mechanism to which by the travel of the carrier the capsule parts are presented, said trimming mechanism comprising a reciprocatory filling pin adapted to enter the capsule part by a movement of the trimming mechanism, and a rotary knife adapted to travel in a circle around said pin to sever the end of the capsule part thereon.

In testimony whereof, we sign this specification in the presence of two witnesses.

ARTHUR COLTON.
BURTON W. SCOTT.

Witnesses:
O. B. BAENZIGER,
I. G. HOWLETT.